Patented Dec. 18, 1951

2,578,955

UNITED STATES PATENT OFFICE 2,578,955

COMPOSITION OF TALL OIL AND AROMATIC OIL AND METHOD OF MAKING IT

Edward A. Van Valkenburgh, Greene, N. Y.

No Drawing. Application October 14, 1950, Serial No. 190,245

7 Claims. (Cl. 106—123)

This invention relates to compositions for use in the compounding and vulcanization of rubber, and particularly of synthetic rubber, and to method of producing such compositions.

This application is a continuation-in-part of my prior application Serial No. 627,103, filed November 6, 1945, now abandoned.

The new compositions of the present invention are homogeneous, liquid compositions made by blending heat treated crude tall oil with a relatively small amount of a non-volatile aromatic oil to give a stable, permanently liquid composition having special advantages for use in the compounding of GR–S synthetic rubbers and mixtures of GR–S synthetic rubber and natural crude rubber. The GR–S synthetic rubbers are copolymers of butadiene and styrene known as Buna S and designated by U. S. Rubber Reserve as GR–S.

Crude tall oil acids are produced as a byproduct from the paper pulp industry and are made up largely of resin acids and fatty acids, e. g., around 50% of resin acids and 40% of fatty acids and around 10% of unsaponifiable material such as sterols and high molecular weight aliphatic alcohols. Such crude products form a semi-solid non-homogeneous mass on standing and may separate into an upper liquid and lower solid or semi-solid layer. Such crude products are not well adapted for use in rubber compounding.

It has been proposed to heat tall oil to high temperatures for prolonged periods of time but even such products when made from crude tall oil tend to develop semi-solid separation which is highly undesirable from the standpoint of rubber compounding, not only on account of handling difficulties but especially because of non-uniformity.

The present invention overcomes the difficulties and objections incident to the use of such prior products and provides a new liquid, homogeneous composition which has special advantages for use in GR–S compounding.

According to the present invention the crude tall oil is subjected to a heat treatment which can advantageously be much less than the heat treatments to which tall oil has heretofore been subjected and there is then added to the heat treated tall oil a small and regulated amount of a non-volatile aromatic oil which blends therewith to give a permanently liquid, stable and homogeneous composition which can be readily weighed and quantitatively poured from a container and which is a valuable composition with GR–S synthetic rubber as well as with mixtures of GR–S and natural crude rubber.

The heat treatment to which the crude tall oil is subjected may vary somewhat and may be carried out, e. g., with continuous mechanical agitation at temperatures of 260–400° F. for intervals of from one-half to one and a half hours. Higher temperatures can be used but in general they are unnecessary and a milder and less expensive heat treatment is sufficient.

The non-volatile aromatic oil used is a coal tar oil, or a petroleum aromatic oil, such as is obtainable by sulfur dioxide extraction of certain crude oils, or such as is produced in high temperature catalytic cracking processes where fractions are obtained high in aromatic constituents. Where the non-volatile aromatic oil is a coal tar oil, it is advantageously one which is largely freed from crystallizable anthracene salts, such as the product sold under the trade name Bardol of the Barrett Company, said product being a coal tar distillate having a specific gravity of about 1.08 to about 1.12, a minimum flash point of about 100° C., with not more than 10% distilling between 210° C. and 235° C. and from 30 to 60% distilling up to 300° C. In general, only small amounts of the aromatic oil are used, e. g., 10 to 30% by weight of the composition, and advantageously between 10 and 15% by weight of the composition.

The non-volatile aromatic petroleum oil is advantageously an oil such as the product known in the trade as Esso Heavy Aromatic Naphtha No. 132, with a specific gravity of 0.905, a flash point of 121, an initial boiling point of 328 with 90% boiling at 489, and a final boiling point of 540° F., containing around 85% aromatics. Another advantageous type of non-volatile petroleum aromatic hydrocarbons is that obtained by the vacuum distillation-catalytic cracking process with fractionation of the products to give fractions containing aromatics as the principal constituent and with the remainder of the fraction made up largely of naphthenes, which are unsaturated, with small amounts of olefins. Such high aromatic fractions have a flash point of 175° F., or higher, an initial boiling point of 386° F., or higher, a specific gravity of 0.919 and a final boiling point around 551° F. and with a percentage of aromatics of e. g. 60% to 70% or more, and with a balance largely of unsaturated naphthenes and a small amount of olefins, with a large proportion of the aromatic components in the form of alkylated naphthylenes.

The compounding process is advantageously carried out by heating the crude tall oil with continued agitation, e. g., to around 350° F. for half an hour or somewhat longer and by then adding the aromatic oil to the hot, liquid, heat-treated tall oil with continued stirring while the composition is cooled. This gives a stable, non-resinous, liquid product especially valuable for compounding GR-S synthetic rubber.

The proportions of aromatic oil can be somewhat varied with the heat treatment to which the tall oil is subjected. In general, the amount of added aromatic oil should not be too high but should be sufficient to insure homogeneous liquid products.

In addition to adding the aromatic oil small and varying amounts of other compounding ingredients can be added in some cases, e. g., petroleum oils, asphalts, etc.

While I do not desire to limit myself by any theoretical explanation, I am led to believe that the heat treatment of the tall oil brings about desirable changes, either physical or chemical since the heat treated tall oil can be compounded with the coal tar oil to give a stable, homogeneous liquid whereas the crude untreated tall oil does not form such compositions with aromatic oils. It may be that in addition to any physical changes that take place there is a change in the resin acids which results in the modification of the resin acids and the formation of appreciable amounts of dehydroabietic acid and dihydroabietic acid. Whatever the theoretical explanation may be, the heat treated crude tall oil has a desirable compatibility with aromatic oil in small amount which the untreated crude tall oil acids do not have and gives a valuable liquid, homogeneous product.

The new composition is of special value for use in compounding GR-S synthetic rubber. It has the advantage over various grades of gum or wood rosin which have been used in rubber compounding in that it gives a desirable rubber to rubber tackiness with a minimum of rubber to metal tack and a minimum retardation of the rate of cure, as distinguished from gum and wood rosins which tend to produce excessive or undesirable rubber to metal tackiness in the uncured stocks, causing troublesome sticking to the mill and calender rolls, and also tending to retard the cure.

The new composition is also a valuable composition for rubber compounding because of its compatibility with GR-S synthetic rubber and in mixtures of GR-S synthetic rubber and natural rubber.

One of the advantages obtained in GR-S rubber compounding with the use of the new composition is a desirable and marked improvement in cut-growth resistance of the cured products.

The new composition is valuable for use as an "activation acid" on account of its chemical effect upon the zinc oxide and organic accelerators in the GR-S rubber compositions, being a valuable substitute for the more expensive stearic acid commonly used.

Thus I have found that the new composition made, e. g., of 87% of heat treated tall oil acids and 13% of non-volatile coal tar oil (Bardol) can satisfactorily be used to replace the much more expensive stearic acid in GR-S tire treads and a similar activation obtained with the use of a somewhat increased amount of the new composition. The new composition has the further advantage of improved mixing efficiency, superior raw processability, better uncured rubber to rubber tackiness and non-bloom effect before and after vulcanization than stearic acid.

When non-volatile petroleum aromatic oils are used, proportions are advantageously around 25%, or between 20 and 30%, the balance being the heat treated tall oil.

When petroleum aromatic oils are used, they are advantageously preheated to a temperature approximating that of the heat treated tall oil before adding the aromatic oil gradually with stirring to the heat treated tall oil. The agitation of the tall oil during the blending operation can be carried out with mechanical agitation, or advantageously with steam agitation. The steam agitation is advantageously used both in preheating the aromatic oil and during the blending operation, since it aids in removing some of the more volatile and odoriferous constituents. Steam distillation may also remove some of the aromatic oil, particularly more volatile components thereof.

From the standpoint of producing the new composition, it can be produced from crude tall oil which is readily available and which is a cheap raw material and the heat treatment can be carried out at moderate expense with subsequent blending of a small amount of the aromatic oil to produce a uniform, stable, activating and plasticiing liquid which is highly compatible with uncured butadiene GR-S copolymer in synthetic rubber compounding and gives improved cut-growth resistance after vulcanization.

While in general, within the limits of compatibility, the heat treatment of the crude tall oil may be at lower temperatures or have shorter times with somewhat larger amounts of the coal tar oil, it is desirable from the standpoint of cured rubber quality not to use too large amounts of the aromatic oil, particularly for GR-S tire tread compounding, since the use of excessive amounts of coal tar oil tends to lower the modulus and cured hardness of the vulcanized rubber.

The invention will be further illustrated by the following specific example giving an advantageous method of carrying out the process of making the new composition and producing a composition having desirable properties for GR-S rubber compounding.

Crude unrefined American tall oil (the Liqro product of the West Virginia Pulp & Paper Company) is heated with continuous mechanical agitation for about half an hour at around 260° F. and there is then rapidly added with continued mechanical stirring an amount of non-volatile coal tar oil (Bardol of the Barrett Company) in the proportions of 13 parts by weight of the coal tar oil to 87 parts by weight of the heat treated crude tall oil. The mechanical agitation is continued while the product is cooled and it can then be drawn off, e. g., into drums or tank cars for shipment.

The composite product so produced having an acid number of around 150 was an excellent stable liquid product having valuable properties as an activation acid in GR-S rubber compounding. The addition of 13% of the coal tar oil to the heat treated crude tall oil resulted in the production of a permanent liquid product highly compatible with GR-S and with mixtures of GR-S and natural crude rubber.

As regards reduction of rubber to metal tackiness, 7 parts of this composition per 100 parts of GR-S and reclaim rubber in a highly loaded military tap sole compound provided sufficient adhesion so that the batch on the sheeting mill "climbed" half way up the front roll without falling into the pan as it was slabbed off, but it was not sufficiently tacky to go over to the back roll of the mill.

With respect to plasticizing efficiency in a high zinc oxide, Captax (mercapto-benzothiazole) accelerated, GR-S test compound, 7.5 parts of the above composition per 100 parts of GR-S were tested in comparison with the same ratio of gum rosin (J. M. Huber's "Turgum"). The Mooney plasticity values after 1.5 minutes respectively were 55 for the rubber compound made with the new composition and 68 for the rubber compound made with the gum rosin, showing the marked improvement of the new composition as a plasticizing agent.

As regarding reduced cure retardation, in a Monex (tetra-methyl-thiuram-monosulfide) accelerated belt friction stock, 20 parts of the above composition per 100 parts of GR-S rubber were compared with a similar ratio of hydrogenated rosin (the Hercules Powder Company's "Staybelite resin"). Standard scorch tests made with the Mooney plastometer showed that the compound made with the new composition was precured in 30 minutes, whereas 66 minutes were required for the stock containing the Staybelite resin, thus showing the reduced cure retardation effect of the new composition as compared with that of the hydrogenated rosin.

Moreover, for these same belt friction stocks, the Shore hardness values for samples cured 20 minutes at 40 pounds steam pressure, respectively, were 54 for the product in which the new composition is used and 47 for the compound in which hydrogenated rosin was used, indicating the faster curing obtained with the new composition.

The invention will be further illustrated by the following example showing the suitability of the new composition for GR-S tire tread compound in direct comparison with a similar tire tread compound containing a similar amount of a liquid asphalt (the C. P. Hall Company's Paraflux). The following compositions were used:

GR-S rubber _____ 100    100
Easy Proc. Channel Black _____ 45     45
Zinc oxide _____ 2.4    2.4
Sulfur _____ 2      2
Santocure (activated mercapto-
  benzothiazol) Monsanto _____ 1.2    1.2
Asphalt (Paraflux) _____ 10.4    —
New composition _____  —     10.4

The above compounds were cured at 280° F. for a wide range of cures and the following final elongation values were obtained, the values in the first column being those for the compound containing the asphalt and those of the second column being those for the compound containing the new composition:

| Minutes Cured | Per Cent Elongation | |
| --- | --- | --- |
| 30 | 950 | 1,090 |
| 45 | 796 | 886 |
| 60 | 703 | 790 |
| 75 | 680 | 760 |
| 90 | 680 | 706 |
| 120 | 660 | 703 |
| 150 | 605 | 650 |

In GR-S tire treads it is important to maintain a high ultimate elongation, especially on long overcures, and the values given above show the superiority of the new composition as contrasted with the use of the asphalt softener.

The invention will be further illustrated by the following example using a composition of heat treated tall oil and aromatic oil from petroleum.

The composition is made by heat treating the tall oil for one hour at about 300 to 350° F. and by similarly preheating the aromatic oil at a similar temperature for a period of one hour, with agitation during heating and, advantageously, with steam agitation. The preheated aromatic oil is then added gradually to the heat treated tall oil, either with mechanical stirring, or with agitation by steam, to form the homogeneous composition. The proportions of heat treated tall oil and aromatic oil are approximately 75% of heat treated tall oil and 25% of aromatic oil, the aromatic oil, containing upwards of 60% aromatics, the remainder being principally unsaturated naphthenes with a small amount of olefins, known in the trade as Esso Aromatic Naphtha No. 180 with a specific gravity of 0.919, a flash point of 178° F., and an initial boiling point of 386° F., with 95% boiling upwards of 526° F., and a final boiling point of 551° F.

This composition was used in two GR-S tire tread compounds having the following compositions:

| | I | II |
| --- | --- | --- |
| | Parts | Parts |
| GR-S rubber (X-478) | 100 | 100 |
| High abrasion furnace black (Phillips Philblack-O) | 50 | 50 |
| Zinc Oxide | 3 | 3 |
| Sulfur | 2 | 2 |
| Santocure (activated mercaptobenzothiazol) Monsanto | 1.2 | 1.2 |
| "Circo" oil (Sun Oil Co. naphthenic oil) | 5 | 1 |
| New composition | 4 | 8 |

The above compounds were cured at 287° F. over a range of cures and the following values were obtained showing tensile strength and final elongation for the two compounds:

| Minutes Cured | I | | II | |
| --- | --- | --- | --- | --- |
| | Tensile | Elongation | Tensile | Elongation |
| 30 | 3,070 | 647 | 3,030 | 693 |
| 45 | 3,580 | 547 | 3,580 | 620 |
| 60 | 3,580 | 503 | 3,660 | 563 |
| 90 | 3,610 | 487 | 3,610 | 505 |

These compounds were subjected to tests for 300% modulus and 500% modulus and for Shore Creep with the following results:

| Minutes Cured | I | | | II | | |
| --- | --- | --- | --- | --- | --- | --- |
| | 300% | 500% | Shore Creep | 300% | 500% | Shore Creep |
| 30 | 980 | 2,270 | 61-54 | 860 | 2,000 | 61-53 |
| 45 | 1,540 | 3,260 | 64-58 | 1,280 | 2,850 | 64-58 |
| 60 | 1,700 | 3,570 | 66-61 | 1,550 | 3,270 | 66-60 |
| 90 | 1,860 | _____ | 67-61 | 1,770 | 3,630 | 67-61 |

The new composition can similarly be used in commercial truck tire treads to replace stearic acid, giving superior raw processing properties and similar cured quality.

It will thus be seen that the present invention provides a new and improved tall oil composition made from cheap crude tall oil which overcomes the objections to the use of crude tall oil and converts it by a process of heat treatment and blending with a non-volatile aromatic oil to a homogeneous, liquid composition particularly advantageous for use in the compounding of synthetic rubbers and particularly GR-S synthetic

I claim:

1. A new composition for compounding with GR-S synthetic rubber and mixtures of such rubber with natural rubber, said composition consisting for the most part of heat treated crude tall oil preheated to a temperature in excess of about 260° F. and blended with a smaller proportion of non-volatile aromatic oil, said proportions being from about 10 to 30% of the heat treated product.

2. A new composition for compounding with GR-S synthetic rubber and mixtures of such rubber with natural rubber, said composition consisting essentially of heat treated crude tall oil preheated to a temperature in excess of about 260° F. and blended with about 10 to 15% of non-volatile aromatic oil.

3. The method of producing a homogeneous liquid composition for use in synthetic rubber compounding which comprises heat treating crude tall oil by heating to an elevated temperature of about 350° F. for a period of about one-half to one and one-half hours and blending with the hot, heat treated oil a smaller proportion of about 10 to 30% of non-volatile, liquid aromatic oil.

4. The method of producing a homogeneous liquid composition for use in synthetic rubber compounding which comprises heat treating crude tall oil to a temperature of around 260 to 400° F. for from one-half to one and one-half hours to heat treat the oil and blending with the hot, heat treated oil about 10 to 30% of a non-volatile aromatic oil.

5. The method of producing a homogeneous liquid composition for use in synthetic rubber compounding which comprises heat treating crude tall oil to a temperature of around 260 to 400° F. for a sufficient time to heat treat the oil and blending with the hot, heat treated oil about 10 to 15% of a non-volatile aromatic oil.

6. A composition as defined in claim 1 in which the non-volatile aromatic oil is a coal tar oil.

7. A composition as defined in claim 1 in which the non-volatile aromatic oil is an aromatic petroleum oil.

EDWARD A. VAN VALKENBURGH.

REFERENCES CITED

The following references are of record in the file of this patent:

UNITED STATES PATENTS

| Number | Name | Date |
|---|---|---|
| 2,343,368 | Daly | Mar. 7, 1944 |
| 2,392,863 | Rudd | Jan. 15, 1946 |
| 2,421,627 | La Crosse | June 3, 1947 |
| 2,448,605 | Kleinicke | Sept. 7, 1948 |

FOREIGN PATENTS

| Number | Country | Date |
|---|---|---|
| 229,296 | Great Britain | May 10, 1926 |
| 45,534 | Sweden | June 18, 1919 |